United States Patent [19]

Eweson, deceased

[11] Patent Number: 5,047,349
[45] Date of Patent: Sep. 10, 1991

[54] MULTI-COMPARTMENT ROTATING DRUM APPARATUS FOR THE FERMENTATION OF NATURAL ORGANIC MATERIAL

[75] Inventor: Eric W. Eweson, deceased, late of Far Hills, N.J., by Dorothy D. Eweson

[73] Assignee: Bedminster Bioconversion Corporation, Cherry Hill, N.J.

[21] Appl. No.: 391,736

[22] Filed: Aug. 8, 1989

Related U.S. Application Data

[63] Continuation of Ser. No. 917,241, Oct. 7, 1986, abandoned, which is a continuation of Ser. No. 551,364, Nov. 14, 1983, abandoned.

[51] Int. Cl.$^5$ ............................................. C12M 1/10
[52] U.S. Cl. ............................ 435/312; 435/303; 435/313; 435/813; 435/819; 422/184; 422/209
[58] Field of Search ............... 435/287, 299, 300, 303, 435/312, 313, 873, 879; 422/209, 210, 184; 34/129; 366/220, 235, 226, 235

[56] References Cited

U.S. PATENT DOCUMENTS

| | | | |
|---|---|---|---|
| 1,818,530 | 8/1931 | Boye | 435/313 X |
| 2,686,754 | 8/1954 | Monod | 435/312 |
| 3,138,447 | 6/1964 | Eweson | 71/9 |
| 3,188,171 | 6/1965 | Ghyssaert | 422/209 X |
| 3,220,804 | 11/1965 | Bachmann et al. | 422/209 X |
| 3,245,759 | 4/1966 | Eweson | 422/210 |
| 3,297,410 | 1/1967 | DeLisle | 422/209 X |
| 3,814,588 | 6/1974 | Eweson et al. | 435/312 X |
| 3,849,903 | 11/1974 | McGehee | 34/135 X |

FOREIGN PATENT DOCUMENTS 3103869  9/1982  Fed. Rep. of Germany ...... 435/287

*Primary Examiner*—David L. Lacey
*Assistant Examiner*—William H. Beisner
*Attorney, Agent, or Firm*—Stanley H. Zeyher

[57] ABSTRACT

A compartmentalized horizontally mounted rotatable cylindrical digester drum is provided with inter-compartment transfer buckets each having an inlet opening substantially congruent to a segment of the circular partition separating one compartment from the next. In addition one or more annular flanges are located in each treatment compartment extending radially inwardly from the cylindrical wall of the drum. The transfer buckets may be rectangular prismatic in contour with a bottom wall within the confines of the drum coincident with the chordal boundary of the segment and an upper wall spaced radially outwardly of the cylindrical wall of the drum.

17 Claims, 2 Drawing Sheets

MULTI-COMPARTMENT ROTATING DRUM APPARATUS FOR THE FERMENTATION OF NATURAL ORGANIC MATERIAL

This application is a continuation of U.S. application Ser. No. 917,241, filed Oct. 7, 1986, now abandoned, which was a continuation of parent application Ser. No. 551,364, filed Nov. 14, 1983, and entitled APPARATUS FOR THE FERMENTATION OF NATURAL ORGANIC MATERIAL, also abandoned.

BACKGROUND OF THE INVENTION

The present invention relates to apparatus for making organic fertilizer, sometimes referred to as compost, or other fermentation products from organic waste materials such as municipal garbage, sewage sludge, animal manure, canning factory wastes and the like.

In my prior patents, U.S. Pat. Nos. 3,138,447 and 3,245,759, a method and apparatus for such manufacture have been described which are designed to produce an efficient and thorough aerobic decomposition of such organic waste materials by maintaining, within the apparatus in which the method is carried out, conditions suitable for optimum propagation of the different types of aerobic bacteria on which such decomposition depends. As described in said patents, the apparatus comprises a digester in the form of a cylindrical drum mounted for rotation on an axis which is slightly inclined towards the discharge end relative to the horizontal. The interior of the digester is divided into a series of compartments or chambers by a plurality of transverse partitions spaced along the axis of rotation. Each partition is provided with transfer buckets which are selectably opened and which, when opened, transfer material from compartment to compartment from the higher to the lower end of the drum, the raw waste organic material being fed into the digester at the higher end and the finished product being withdrawn at the lower end.

The requisite inoculation of the charge in each compartment is effected by retaining a portion of the treated material in each compartment to mix with the material received from the adjacent upstream compartment. In my said prior apparatus, the inoculation material is retained in each compartment by locating the openings in the partitions, which openings communicate with the transfer buckets, displaced a short distance from the periphery of the partition. Such openings are also relatively small compared to the size of the partitions.

As explained in said patents, the method relies upon staging the fermentation process by maintaining optimum but different temperatures in each of the compartments for efficient promotion of the microbial activity. For this purpose air is forced through the entire digester from the discharge or lower end of the drum to the input or higher end, and spent air is selectably and controllably vented from each compartment to maintain the climate therein that is optimum for the microorganisms predominant in the stage associated with such compartment. Efficiency of such method and apparatus depends upon being able to effect rapid transfer of material between compartments causing minimum albeit inevitable interruption of the biological activity. Further important parameters are the speed with which a charge entering a compartment can be mixed with the inoculant retained in such compartment, as well as the capability of retaining at least the necessary minimum and, preferably, an optimum quantity of inoculant.

While the apparatus described in said patents is suitable for carrying out said method, it has been discovered that the efficiency can be increased by increasing the speed with which inter-compartment transfer can be accomplished and, at the same time, modifying the means for automatically retaining the inoculant material in each compartment, whereby more immediate and thus more efficient mixing between the inoculant and incoming charge is effected.

SUMMARY OF THE INVENTION

In accordance with the present invention there is provided apparatus for the fermentation of natural organic material by treating with successive groups of aerobic microorganisms which comprises a digester drum mounted for rotation about its longitudinal axis, one or more circular partitions positioned within said drum to device said drum into a series of treatment compartments, an entry at one end of said drum for enabling introduction of said material, a discharge port at the opposite end of said drum for permitting discharge of treated material, said axis of said drum being inclined from the horizontal so as to position said entry at a higher elevation than said discharge port, transfer buckets adjacent each of said partitions to receive material from a higher elevation compartment and selectively operable to transfer such material to a lower elevation compartment, means for forcing air into said digester drum and to cause said air to move through said drum from the lower elevation to the higher elevation end thereof, and adjustable valve means communicating with each said compartment to exhaust a selectable portion of said air in said compartment to the atmosphere, wherein said transfer buckets are located on the lower elevation side of each said partition in constant communication with the said compartment on the higher elevation side of the respective partition through an inlet opening through the partition which opening is bounded on one side by a chord of the circle that marks the perimeter of said circular partition and on the other side by the wall of said digester drum, each said transfer bucket being provided with a valve controlled discharge opening, and means disposed in each said compartment for retaining in the said compartment a quantity of material to serve as an inoculant for inoculating material entering the compartment.

BRIEF DESCRIPTION OF THE DRAWINGS

The invention will be better understood after reading the following detailed description of the presently preferred embodiments thereof with reference to the appended drawings in which.

The same reference numerals are used throughout the drawings to designate the same or similar parts.

DETAILED DESCRIPTION OF THE PRESENTLY PREFERRED EMBODIMENTS

Figure 1:
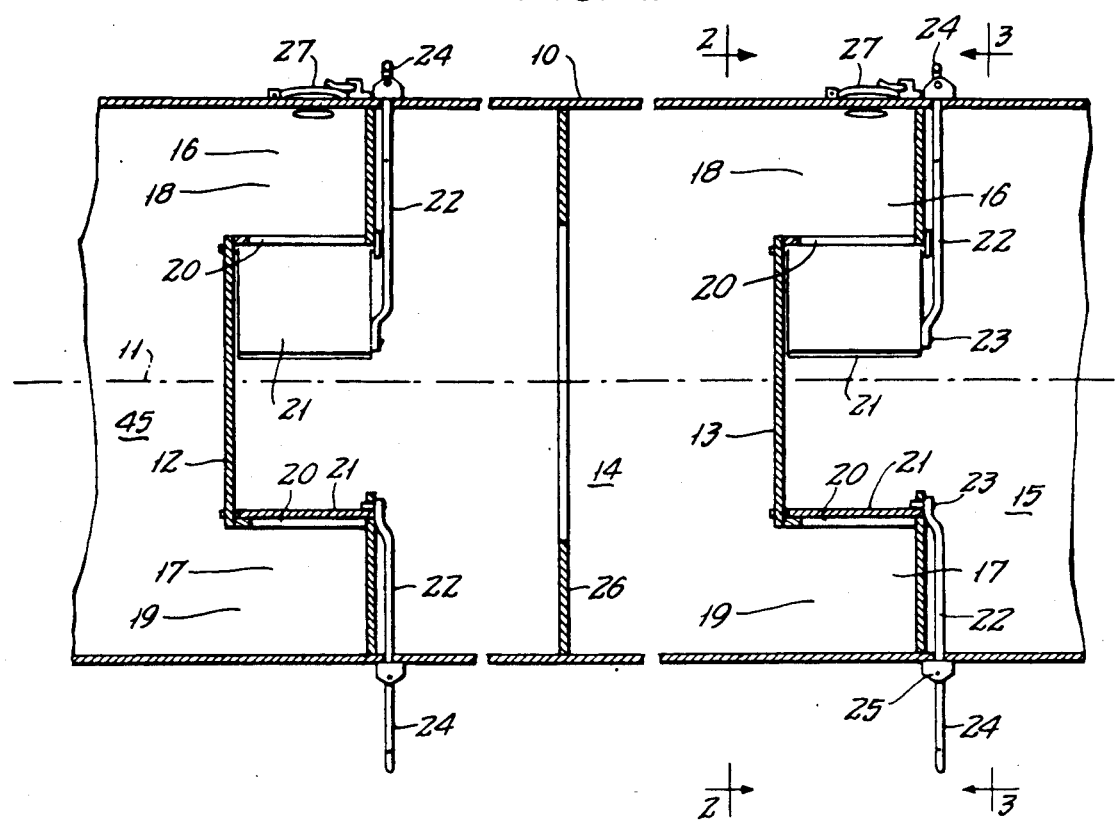
FIG. 1 is longitudinal vertical sectional view of an intermediate portion of a digester drum constructed in accordance with the present invention.
Figure 2:
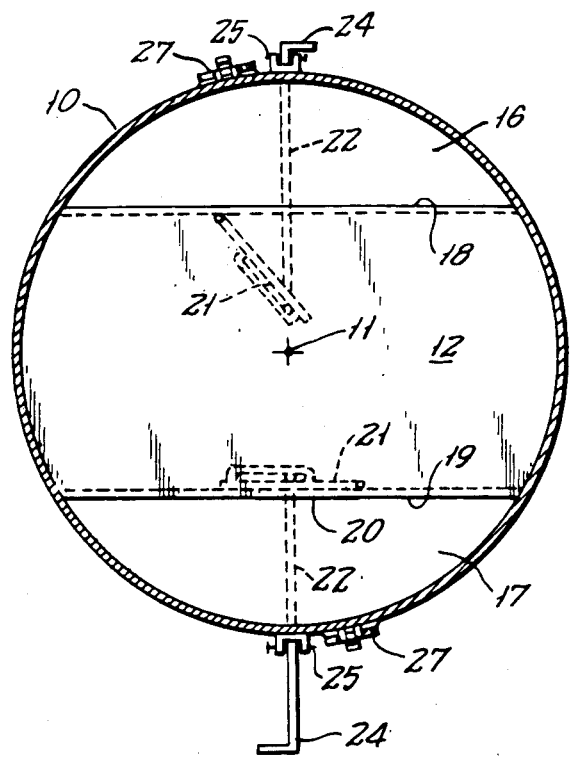
FIG. 2 is a transverse sectional view taken along line 2—2 in FIG. 1 showing the access ports or openings in a partition for the transfer buckets.
Figure 3:
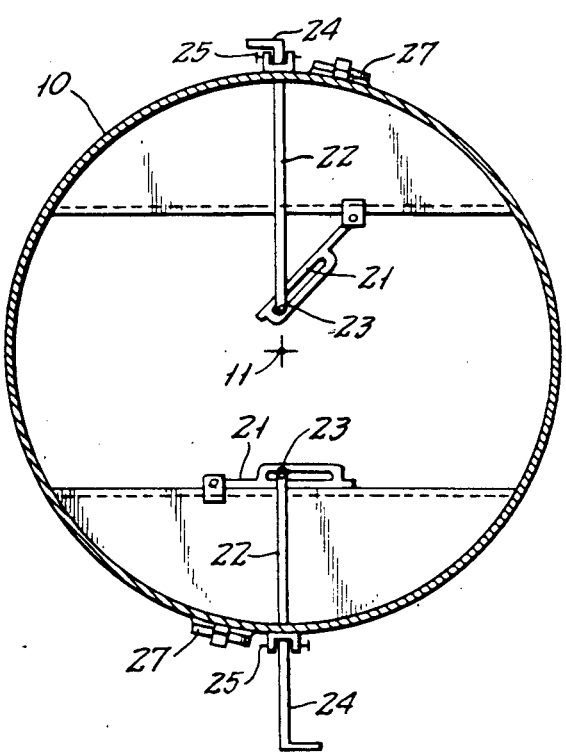
FIG. 3 is a transverse sectional view taken along line 3—3 in FIG. 1 showing the opposite side of the partition.

Referring to FIGS. 1, 2 and 3 of the drawings, there is shown an intermediate portion of a digester comprising a drum 10 mounted in known manner (not shown) on bearing blocks for rotation about an axis 11 which is slightly inclined from the horizontal to allow gravity feed of the material through the length of the drum from the higher elevation to the lower elevation end. Details for mounting and rotating the drum as well as for supplying forced air thereto and both introducing and removing material therefrom can best be seen from my above-identified patents. As shown in the present drawings, the drum 10 is subdivided into compartments by circular partitions such as the partitions 12 and 13. While two partitions and the concomitant three compartments, 14, 15 and 45, are shown in the drawings, it is to be understood that the drum 10 is subdivided into as many compartments as are required to carry out the desired fermentation process. In my prior patents the drum is divided into four treatment compartments wherein quantity of inoculant material is retained for propagating the fermentation process therein. However, two or more compartments are contemplated depending upon the particular processing parameters.

Selectively operable transfer buckets 16 and 17 are provided adjacent each of the partitions such as 12 and 13 to move material from the higher elevation to a elevation lower compartment. As shown in the drawing, the transfer buckets are located on the downstream side of each partition in constant communication with the compartment on the upstream side of the respective partition through the inlet openings 18 and 19, respectively, which openings are bounded on one side by a chord of the circle that marks the perimeter of the respective partition and on the other side by the wall of the digester drum, thus being congruent to a geometric segment of circular the partition. In the preferred embodiment, the transfer buckets are enlarged to effect a more rapid flow rate of organic material through the apparatus, to insure complete filling of the buckets with each rotation, and to permit entry of large pieces of sewage into the apparatus. Each transfer bucket provided with a valve controlled discharge opening 20 controlled by the gravity operable valve 21. As best seen in FIG. 3, a link 22 is connected at one end 23 to the valve 21 while the other end of the link 22 projects at end 24 through the wall of drum 10. End 24 is operatively connected to discharge opening 20 through link 22 for selectively transferring material between compartments, as shown in FIG. 1. The link 22 may be provided with suitable apertures through which can be inserted a pin, bolt or other latch member 25 to selectively engage and hold the valve 21 in closed position as illustrated with respect to bucket 17 or in open position as illustrated with respect to bucket 16. When the latch pin 25 is removed to free the link 22, the valve 21 will be free to operate under the forces of gravity as the drum rotates.

Each compartment in the drum is provided with flow inhibiting means in the form of an annular flange 26 for retaining in the compartment an effective quantity of material for inoculating material entering the compartment. The flange 26 extends radially inwardly from the cylindrical wall of the drum 10 and, preferably, has a height related to the diameter of the drum falling within the range of about 9% to 23%. In a drum having a diameter of about 11 feet, where the partitions are spaced about 36 feet apart, a single retainer ring or annulus 26 having a height of about 18 inches and located about midway between the partitions or end walls defining the compartment, will retain a quantity of material in the compartment equal to about 5% of the quantity of incoming material that is to be inoculated. This is for a digester inclined at the rate of 1 foot in 30 feet from the horizontal. In order to assure about 10% of retained inoculant, a central ring (flange) in a compartment of the aforesaid dimensions should have a height of about 30 inches. Alternatively, two rings (flanges) about 16 inches high with one located about midway between the partitions defining the compartment and a second one located about midway between the first flange and that one of the partitions that is upstream from the first flange will provide the same 10% rate of inoculation.

It should be apparent that by making openings 18 and 19 congruent with geometrical segments of the circular partition, rapid filling of the transfer buckets can take place as the drum rotates. The links 22 movably and permanent connected to the valves 21 serve a number of functions. Because the end 24 is exposed outside of the drum, the link acts as an indicator regarding proper closing and opening of the respective valve member 21. Indication can be furnished by direct observation or indirectly by suitable telemetry apparatus under the control of the link. If the valve should be stuck or clogged for any reason the link 22 can be manipulated from the outside of the digester with reasonable likelihood that it will serve to free the valve. If for some reason this does not occur, access to the valve area can be had through a port such as that shown at 27.

Figure 4:
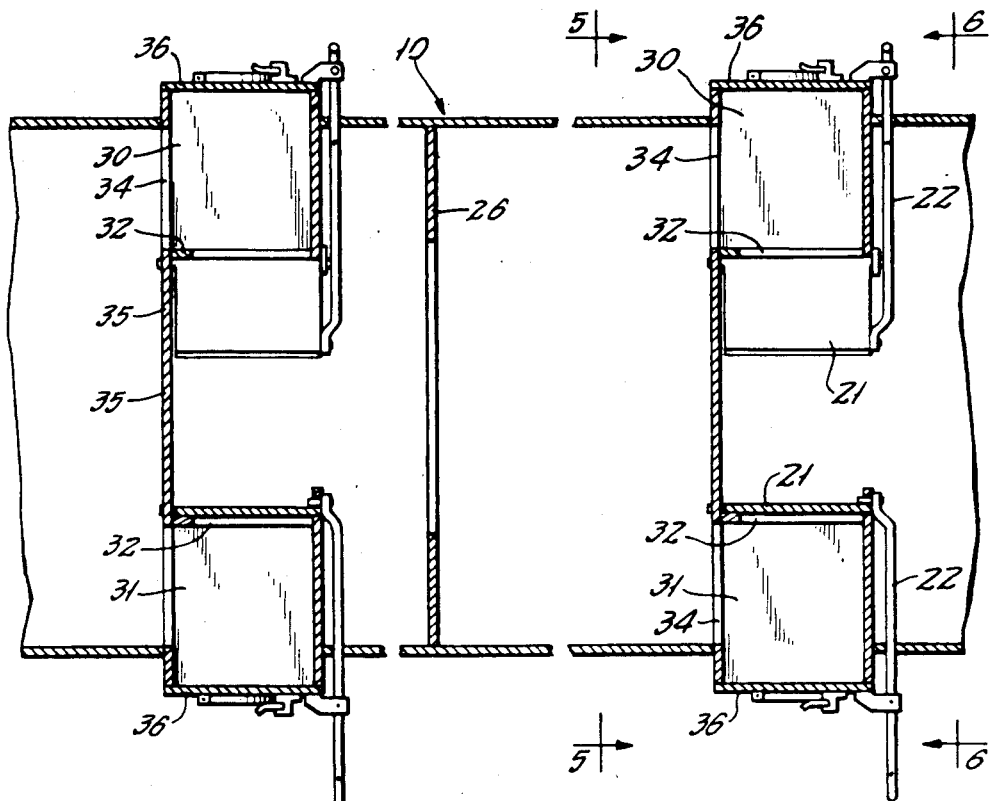
FIG. 4 is a view similar to FIG. 1 but showing a modification thereof.
Figure 5:
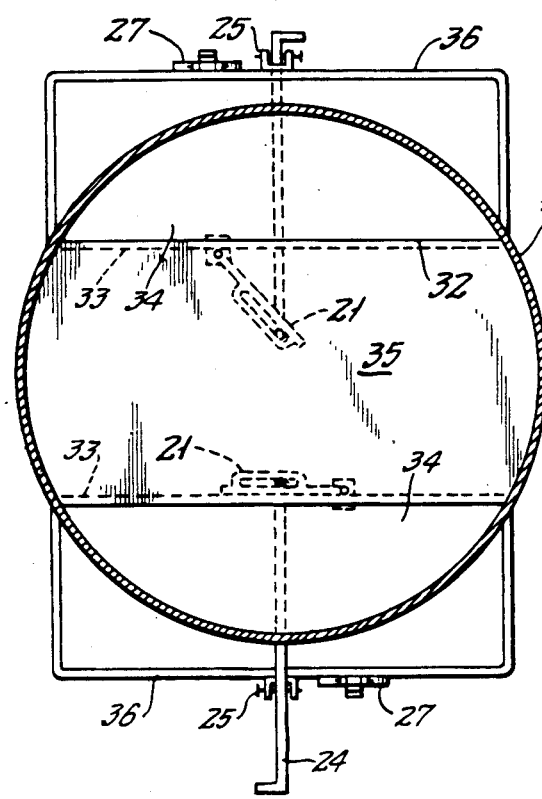
FIG. 5 is a transverse sectional view taken along line 5—5 in FIG. 4 showing a partition from the side with the openings leading to the transfer buckets.
Figure 6:
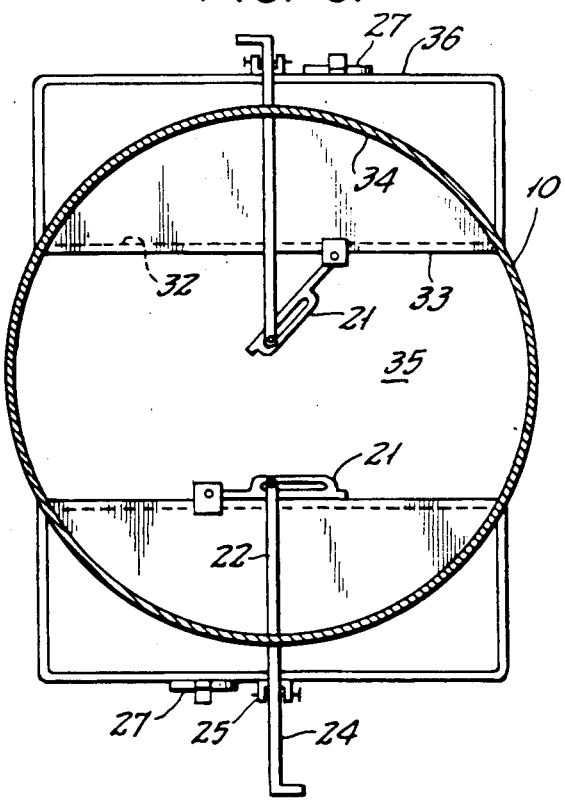
FIG. 6 is a transverse sectional view taken along line 6—6 in FIG. 4 showing the transfer buckets from the opposite side of the partition.

Further improvement can be obtained by resorting to the modification shown in FIGS. 4, 5 and 6 to which attention should now be directed. As seen therein the transfer buckets 30 and 31 are constructed as separate right rectangular prismatic containers having a bottom wall 32 within the confines of the drum 10, the interior surface of wall 32 defining a plane coincident with the chordal boundary 33 of the geometrical segment 34 of circular partition 35. The upper wall 36 of each of the transfer buckets 30 and 31 is spaced radially outwardly of the cylindrical wall of the drum 10. In all other respects the construction of the digester shown in FIGS. 4, 5 and 6 may be the same as that previously described with reference to FIGS. 1, 2 and 3. It should be understood that the buckets 30 and 31 can be fabricated as separate components and inserted each through an opening in the cylindrical wall of the drum 10 where it is fastened in any suitable manner to the supporting partition such as 35 and/or to the cylindrical shell of the drum. This mode of construction, obviously, permits replacement and ready repair of the transfer bucket structure if any part of it should fail during the life of the digester.

One of the advantages of the construction shown in FIGS. 4, 5 and 6 is that when the bucket is at the low point with respect to the drum 10 the material in the associated drum compartment is acted on by gravity and can fall into the radially outwardly (at this point downwardly) projecting portion of the bucket rather than merely sliding into it as will occur with the embodiment of FIGS. 1 to 3. It should be apparent that the enlarged bucket construction of FIGS. 4 to 6 will effect more rapid transport of material from compartment to compartment than the buckets shown in FIGS. 1 to 3. Of course, the buckets shown in any of the Figs. of the present application are capable of more rapid material transport than the buckets described in my aforesaid patents.

In conclusion, it should be readily understood that by altering the dimensions of the annular flanges 26 and their location within the particular compartment of the digester, ready control can be obtained with regard to the quantity of inoculant that is held back to be mixed with the incoming charge. The effectiveness of the flanges 26 is independent of operator control and insures that a minimum quantity of inoculant is always retained to insure efficient microbial activity.

Having described the present preferred embodiments of the invention with reference to the appended drawings, it should be understood by those skilled in the art that various changes in construction can be introduced without departing from the true spirit of the invention as defined in the appended claims.

What is claimed is:

1. Apparatus for the fermentation of natural organic material by treating with successive groups of aerobic microorganisms which comprised a digester drum mounted for rotation about its longitudinal axis, one or more partitions positioned in planes transverse to the longitudinal axis of said drum and dividing said drum into a series of treatment compartments, each of said partitions having the shape of a geometric segment of a circle bounded by parallel chordal lines, an entry at one end of said drum for introducing the material, a discharge port at the opposite end of said drum for discharging of treated material, said axis of said drum being inclined from the horizontal so as to position said entry at a higher elevation than said discharge port, transfer buckets to receive material from a higher elevation compartment and selectively operable to transfer such material to a lower elevation compartment, each of said buckets being bound on a first side by a first surface of the drum, on a second side by a second surface extending from one of the chordal lines downstream longitudinally of the axis of the drum and on a third side by a surface joining said first and second surfaces, and each of said transfer buckets having an inlet opening which confronts the higher elevation compartment substantially in the plane of the partition and a discharge opening in said second side communicating with the lower elevation compartment, said inlet opening being defined by said one chordal line and wall portions of said digester drum, means for forcing air into said digester drum and to cause the air to move through said drum from the lower elevation to the higher elevation end thereof, and adjustable valve means communicating with each of said compartments to exhaust a selectable portion of the air from each of said compartments to the atmosphere, and each of said transfer buckets being provided with a valve member for closing said discharge opening, a link movably and permanently connected to said valve member for controlling said valve member, said link projecting externally through said digester drum for providing an external indication of the operation of said valve member, and flow inhibiting means disposed in each of said compartments transverse to the longitudinal axis of the drum and spaced from said partitions along said axis of the drum and spaced from said partitions along said axis, said flow inhibiting means comprising at least an annular flange extending radially inwardly from the cylindrical wall of the drum and of a size sufficient for retaining in each of said compartments a predetermined quantity of material to serve as an inoculant for inoculating material entering the compartment.

2. Apparatus according to claim 1, further comprising means for selectively engaging said link to hold the valve member in a closed position.

3. Apparatus according to claim 1, wherein said flange has a height related to the diameter of said drum falling within the range of about 9% to 23%.

4. Apparatus according to claim 3, wherein said drum has a diameter of about 11 feet and said flange has a height of between about 18 and 30 inches, said flange being located in about the middle of each of said compartments.

5. Apparatus according to claim 1, wherein said flow inhibiting means in each of said compartments comprises a plurality of annular flanges extending radially inwardly from the cylindrical wall of the drum within each of compartments.

6. Apparatus according to claim 5, wherein a first of said plurality of annular flanges is located in about the middle of each of said compartments, said first of said plurality of annular flanges dividing each of said compartments into an upstream section and downstream section where the upstream section is proximal to said entry with respect to the downstream section and a second of said plurality of annular flanges is located in about the middle of the upstream section.

7. Apparatus according to claim 6, wherein said flanges extend radially about 16 inches.

8. Apparatus for the fermentation of natural organic material by treating with successive groups of aerobic microorganisms which comprises a digester drum mounted for rotation about its longitudinal axis, one or more partitions transversely positioned within said drum and dividing said drum into a series of treatment compartments, an entry at one end of said drum for enabling introduction of the material, a discharge port at the opposite end of said drum for permitting discharge of treated material, said axis of said drum being inclined from the horizontal so as to position said entry at a higher elevation than said discharge port, transfer buckets adjacent each of said partitions to receive material from a higher elevation compartment and selectively operable to transfer such material to a lower elevation compartment, means for forcing air into said digester drum and causing the air to move through said drum from the lower elevation to the higher elevation thereof, and adjustable valve means communicating with each of said compartments to exhaust a selectable portion of the air from each of said compartments to the atmosphere, each of said transfer buckets being located on the lower elevation side of each partition in communication with the compartment on the higher elevation side of the dividing partition through inlet openings provided in said partition, said inlet openings occupying a substantial portion of the cross sectional area of the drum whereby to permit transfer of material of substantial size and quantity through the apparatus, each of said buckets being provided with a discharge opening and a valve member for closing said discharge opening, a link movable and permanently connected to said valve member for controlling the operation of said valve member, said link projecting externally through said digester drum for providing an external indication of the operation of said valve member, and flow inhibiting means disposed in each of said compartments for retaining in each of said compartments a quantity of material to serve as an inoculant for inoculating material entering the compartment.

9. Apparatus according to claim 2, wherein each of said transfer buckets have walls located radially outwardly of the cylindrical wall of said drum.

10. Apparatus according to claim 9, wherein said flow inhibiting means in each of said compartments comprises an annular flange extending radially inwardly from the cylindrical wall of the drum within the respective compartment.

11. Apparatus according to claim 9, wherein said flow inhibiting means in each of said compartments comprises a plurality of annular flanges extending radially inwardly from the cylindrical wall of the drum with the respective compartment.

12. Apparatus according to claim 11, wherein a first of said plurality of annular flanges is located in about the middle of each of said compartments, said first of said plurality of annular flanges dividing each of said compartments into an upstream section and a downstream section where the upstream section is proximal to said entry with respect to the downstream section, and a second of said plurality of annular flanges is located in about the middle of the upstream section.

13. Apparatus for the fermentation of natural organic material by treating with successive groups of aerobic microorganisms which comprises a digester drum mounted for rotation about its longitudinal axis and divided by transverse partitions into compartments for retention of successive groups of microorganisms, each of said partitions having the shape of a circular area truncated by parallel chordal lines; an entry at one end of said drum for introducing the material, a discharge port at the opposite end of said drum for discharging of treated material, said axis of said drum being inclined from the horizontal so as to position said entry at a higher elevation than said discharge port; transfer buckets associated with each of said partitions, each of said transfer buckets having an inlet for receiving material from a compartment and a discharge opening for transferring material between compartments; the inlet being defined by one of the chordal lines and wall portions of the digester subtended by said one chordal line; means for forcing air into said digester drum to cause the air to move through said drum from the lower elevation to the higher elevation end thereof; valve means associated with the discharge opening of each of said transfer buckets for selectively transferring material between compartments and linkage means associated with said valve means, a portion of said linkage means extending through the wall of said drain for providing an external visual aid to indicate the proper closing and opening of said valve means; and means disposed in each of said compartments for retaining in the compartment a quantity of material to serve as an inoculant for inoculating material entering the compartment.

14. Apparatus according to claim 13 further including means for selectively engaging said linkage means to hold the valve means in a closed position.

15. Apparatus for the fermentation of natural organic material by treating with successive groups of aerobic microorganisms which comprises a digester drum mounted for rotation about its longitudinal axis, one or more partitions transversely positioned within said drum and dividing said drum into a series of treatment compartments, each of said partitions having the shape of a geometric segment of a circle having parallel chordal boundaries, an entry at one end of said drum for introducing the material, a discharge port at the opposite end of said drum for discharging of treated material, said axis of said drum being inclined from the horizontal so as to position said entry at a higher elevation than said discharge port, transfer buckets for receiving material from a higher elevation compartment and selectively operable to transfer such material to a lower elevation compartment, means for forcing air into said digester drum and causing the air to move through said drum from the lower elevation to the higher elevation end thereof, and adjustable valve means communicating with each of said compartments to exhaust a selectable portion of the air from each of said compartments to the atmosphere, each of said transfer buckets being located on the lower elevation side of each of said partitions in constant communication with the compartment on the higher elevation side of the partition through inlet openings defined by one of the chordal boundaries and wall portions of said digester drum, and of size permitting transfer of material of substantial quantity and size from one compartment to the next; each of said transfer buckets communicating with said inlet opening and being provided with a valve member, a discharge opening controlled by said valve member and a link movable and permanently connected to said valve member, said link projecting externally through said digester drum for providing an external indication of the operation of said valve member, and flow inhibiting means disposed in each of said compartments in a plane transverse to the longitudinal axis of the drum and spaced from said partition along said axis and being of a size sufficient for retaining in each of said compartments a quantity of material to serve as an inoculant for inoculating material entering the compartment.

16. Apparatus for the fermentation of natural organic material by treating with successive groups of aerobic microorganisms which comprises a digester drum mounted for rotation about its longitudinal axis, one or more partitions transversely positioned within said drum and dividing said drum into a series of treatment compartments, each of said partitions having the shape of a geometric segment of a circle having parallel chordal boundaries, an entry at one end of said drum for enabling introduction of the material, a discharge port at the opposite end of said drum for permitting discharge of treated material, said axis of said drum being inclined from the horizontal so as to position said entry at a higher elevation than said discharge port, transfer buckets adjacent each of said partitions to receive material from a higher elevation compartment and selectively operable to transfer such material to a lower elevation compartment, means for forcing air into said digester drum and causing the air to move through said drum from the lower elevation to the higher elevation end thereof, and adjustable valve means communicating with each of said compartments to exhaust a selectable portion of the air from each of said compartments to the atmosphere, each of said transfer buckets being located on the lower elevation side of each of said partitions in constant communication with said compartment on the higher elevation side of the respective partition through inlet openings defined by one of the chordal boundaries and wall portions of said digester drum, said inlet openings occupying a substantial portion of the cross sectional area of the drum, each of said transfer buckets communicating with said inlet opening and being provided with a discharge opening and a valve member for closing said discharge opening, a link movable and permanently connected to said valve member for controlling said valve member, said link projecting externally through said digester drum for providing an external indication of the operation of said valve member, and flow inhibiting means comprising an annulus disposed in each of said compartments, spaced from said partitions along the longitudinal axis of said drum, and being of a size sufficient for retaining in each of said compartments a quantity of material to service as an inoculant for inoculating material entering the compartment.

17. Apparatus for the fermentation of natural organic material by treating with successive groups of aerobic microorganisms which comprises a digester drum mounted for rotation about its longitudinal axis, one or more partitions transversely positioned within said drum and dividing said drum into a series of treatment compartments, each of said partitions having the shape of a geometric segment of a circle bounded by parallel chordal lines, an entry at one end of said drum for enabling introduction of the material, a discharge port at the opposite end of said drum for permitting discharge of treated material, said axis of said drum being inclined from the horizontal so as to position said entry at a higher elevation than said discharge port, transfer buckets adjacent each of said partitions to receive material from a higher elevation compartment and selectively operable to transfer such material to a lower elevation compartment, means for forcing air into said digester drum and causing air to move through said drum from the lower elevation to the higher elevation end thereof, and adjustable valve means communicating with each of said compartments to exhaust a selectable portion of the air from each of said compartments to the atmosphere, each of said transfer buckets being located on the lower elevation side of each of said partitions in communication with said compartment on the higher elevation side of the dividing partition through inlet openings defined by one of the chordal lines and wall portions of said digester drum, said inlet openings occupying a substantial portion of the cross sectional area of the drum whereby to permit transfer of material of substantial size and quantity from one compartment to the next, each of said transfer buckets comprising a substantially rectangular box side walls of which extend radially beyond the drums surface, each of said buckets being provided with a discharge opening and a valve member for closing said discharge opening, and a link movable and permanently connected to said valve member, said link projecting externally through said digester drum for providing an external indication of the opening and closing of said valve member, and flow inhibiting means disposed in each of said compartments, spaced from said partitions along the longitudinal axis of said drum, and being of a size sufficient for retaining in each of said compartments a quantity of material to serve as an inoculant for inoculating material entering the compartment.

* * * * *